US012077260B2

United States Patent
Guo et al.

(10) Patent No.: US 12,077,260 B2
(45) Date of Patent: Sep. 3, 2024

(54) ANTI-WAVE FLOATING PHOTOVOLTAIC DEVICE AND CONTROL METHOD THEREOF

(71) Applicants: Shanghai Maritime University, Shanghai (CN); Shanghai Kanbao Co., Ltd., Shanghai (CN)

(72) Inventors: Jiamin Guo, Shanghai (CN); Qian Li, Shanghai (CN); Xindan Liu, Shanghai (CN); Guangzhong Liu, Shanghai (CN); Danda Shi, Shanghai (CN); Weigang Chen, Shanghai (CN); Guangen Zhou, Shanghai (CN); Fengxi Song, Shanghai (CN); Weize Ma, Shanghai (CN)

(73) Assignees: Shanghai Maritime University, Shanghai (CN); Shanghai Kanbao Co., Ltd., Shanghai (CN)

( * ) Notice: Subject to any disclaimer, the term of this patent is extended or adjusted under 35 U.S.C. 154(b) by 0 days.

(21) Appl. No.: 18/455,590

(22) Filed: Aug. 24, 2023

(65) Prior Publication Data
US 2024/0262468 A1    Aug. 8, 2024

(51) Int. Cl.
*B63B 35/44* (2006.01)
*B63B 1/14* (2006.01)
(Continued)

(52) U.S. Cl.
CPC .............. *B63B 35/44* (2013.01); *B63B 1/14* (2013.01); *B63B 7/04* (2013.01); *B63B 22/00* (2013.01);
(Continued)

(58) Field of Classification Search
CPC ....... B63B 1/14; B63B 2001/145; B63B 7/00; B63B 2007/003; B63B 7/02; B63B 7/04;
(Continued)

(56) References Cited

U.S. PATENT DOCUMENTS 10,715,078 B2 *  7/2020  Jeon ....................... F16M 11/38
11,362,228 B2 *  6/2022  Atwater .......... H01L 31/022433
(Continued)

FOREIGN PATENT DOCUMENTS

CN     102739111 A     10/2012
CN     105757438 A      7/2016
(Continued)

OTHER PUBLICATIONS

Notification of registration procedures, issued in CN202310053596.0 (priority application), by CNIPA, dated May 12, 2023.
(Continued)

*Primary Examiner* — Ajay Vasudeva
(74) *Attorney, Agent, or Firm* — Zhu Lehnhoff LLP

(57) ABSTRACT

An anti-wave floating photovoltaic device comprises a folding panel frame, an elastic support leg, a buoy and a self-locking support rod. The folding panel frame includes multiple unit frames and configured to be folded or unfolded by Miura folding. The adjacent unit frames are connected by a hinge mechanism and a photovoltaic panel is provided on the front side of the folded panel frame. The elastic support leg includes a V-shaped support rod and a U-shaped support rod with a changeable opening and providing elasticity through springs. The buoy includes a power buoy, an intermediate buoy and a driven buoy. The power buoy connects the intermediate buoy and the driven buoy through a rod.

10 Claims, 5 Drawing Sheets

(51) Int. Cl.
  *B63B 7/00* (2020.01)
  *B63B 7/04* (2020.01)
  *B63B 22/00* (2006.01)
  *H02S 20/30* (2014.01)
  *H02S 30/10* (2014.01)
  *H02S 30/20* (2014.01)

(52) U.S. Cl.
  CPC .............. *H02S 20/30* (2014.12); *H02S 30/10* (2014.12); *H02S 30/20* (2014.12); *B63B 2001/145* (2013.01); *B63B 2007/003* (2013.01); *B63B 2035/4453* (2013.01)

(58) Field of Classification Search
  CPC ......... B63B 22/00; B63B 39/00; B63B 39/10; B63B 35/44; B63B 2035/4453; H02S 20/00; H02S 20/30; H02S 30/00; H02S 30/10; H02S 30/20; F24S 20/70; F24S 30/425; F24S 30/428; F24S 30/455; F24S 30/458
  See application file for complete search history.

(56) References Cited

U.S. PATENT DOCUMENTS

| | | | |
|---|---|---|---|
| 11,788,800 B2 * | 10/2023 | Grinham | F28F 3/12 165/80.4 |
| 2016/0056321 A1 | 2/2016 | Atwater et al. | |
| 2017/0047987 A1 | 2/2017 | Pellegrino et al. | |
| 2019/0131919 A1 | 5/2019 | Bjårneklett et al. | |
| 2022/0224279 A1 | 7/2022 | Zimmermann | |
| 2024/0043094 A1 * | 2/2024 | Huiskamp | B63B 35/44 |
| 2024/0063752 A1 * | 2/2024 | Kim Joar | H02S 40/36 |

FOREIGN PATENT DOCUMENTS

| | | | | |
|---|---|---|---|---|
| CN | 205847145 U | | 12/2016 | |
| CN | 107124135 A | | 9/2017 | |
| CN | 108494354 A | * | 9/2018 | ............ H02S 30/20 |
| CN | 109639217 A | | 4/2019 | |
| CN | 209448696 U | | 9/2019 | |
| CN | 110450917 A | | 11/2019 | |
| CN | 110677112 A | | 1/2020 | |
| CN | 111498034 A | | 8/2020 | |
| CN | 111578783 A | | 8/2020 | |
| CN | 212413103 U | | 1/2021 | |
| CN | 114155998 A | | 3/2022 | |
| CN | 115149887 A | | 10/2022 | |
| CN | 114802627 B | * | 3/2023 | |
| CN | 115800899 A | | 3/2023 | |
| CN | 116743059 A | * | 9/2023 | |
| GB | 2117713 A | | 10/1983 | |
| JP | 2008284860 A | * | 11/2008 | |
| JP | 2009051620 A | * | 3/2009 | |
| JP | 2013247237 A | | 12/2013 | |
| KR | 101935305 B1 | | 1/2019 | |
| WO | WO-2021206542 A1 | * | 10/2021 | ............ H02S 30/20 |
| WO | WO-2022135729 A1 | * | 6/2022 | ............ B63B 35/34 |

OTHER PUBLICATIONS

Notification of grant of invention patent, issued in CN202310053596.0 (priority application), by CNIPA, dated May 12, 2023.

* cited by examiner

ANTI-WAVE FLOATING PHOTOVOLTAIC DEVICE AND CONTROL METHOD THEREOF

REFERENCE TO RELATED APPLICATIONS

The present application claims the priority of Chinese patent application No. 202310053596.0, filed on Feb. 3, 2023, the entire disclose of which is incorporated herein by reference.

TECHNICAL FIELD

The invention relates to the field of offshore photovoltaic power generation platforms, in particular to n anti-wave floating photovoltaic device and control method thereof.

BACKGROUND

As a new type of renewable energy, solar energy has been vigorously developed due to its irreplaceable advantages. At present, solar photovoltaic panels are widely used on land, but the development of solar power generation on land has certain limitations. It not only takes up a lot of valuable land resources, but also needs to be installed in areas with good lighting conditions. Building photovoltaic power stations on the sea can effectively save land resources and have little impact on the marine ecological environment.

In the current related technologies, first of all, most of the floating photovoltaic devices only consider the flexible connection of the floating body, and the photovoltaic modules themselves are still fixed by rigid trusses. If the photovoltaic modules are arranged obliquely towards the sun, the photovoltaic modules will be subject to a large wind load, which will easily cause fatigue damage to the rigid truss. If the photovoltaic modules are arranged in a flat manner, the photovoltaic modules cannot face the sun directly, and the power generation efficiency will be greatly reduced. Secondly, when the floating photovoltaic device is in a harsh environment, the conventional structure has a large wind or wave receiving area, which is easy to cause damage to the photovoltaic modules in the local stress concentration area, thereby affecting the wind and wave resistance of the overall photovoltaic device and causing greater economic losses.

Therefore, it is necessary to provide a wind and wave resistant floating photovoltaic device and a control method to solve the above problems.

SUMMARY

The object of the present invention is to provide a wind and wave resistant floating photovoltaic device and control method thereof. The folding and unfolding of the floating photovoltaic device is realized through the Miura folding structure, and the posture of the floating photovoltaic device is controlled by self-locking support rod and ropes.

In order to achieve the above object, the present invention provides an anti-wave floating photovoltaic device, comprising a folding panel frame including multiple unit frames and configured to be folded or unfolded by Miura folding, an elastic support leg configured to be installed under reinforcing beams on both sides of a back peak line of the folded panel frame on the side facing away from the sun, a buoy configured to be installed below bottom of a front peak line of the folding panel frame through a hinged node and a cross base, and a self-locking support rod including a first circular tube slide rail, a second circular tube slide rail and a third circular tube slide rail, wherein the adjacent unit frames are connected by a hinge mechanism and a photovoltaic panel is provided on the front side of the folded panel frame facing the sun and two horizontally adjacent buoys are connected to a rope through the self-locking support rod.

In an embodiment, the folded panel frame includes a plurality of unit frames in the shape of parallelogram and provided with hinge mechanisms on four sides; wherein a photovoltaic panels is installed inside the unit frame on front of the folding panel frame, and a reinforcing beam are installed at connection line of an obtuse angle inside the unit frame on back of the folding panel frame; wherein internal bisection point of the reinforcing beam is configured to be passed by an anti-slip ladder rod parallel to an upper and lower sides of the unit frame, and two ends of the anti-slip ladder rod are fixed on both sides of the unit frame, and an anti-wind plate is installed on the unit frame at the back of last row of the folding board frame.

In an embodiment, wherein the elastic support leg include a V-shaped support rod and a U-shaped support rod; bottom intersection of the V-shaped support rod is hinged to an upper hinged base, and bottom of the U-shaped support rod is hinged to a lower hinged base; the V-shaped support rod and the U-shaped support rod is configured to have a changeable opening and left and right ends of the V-shaped support rod and the U-shaped support rod are configured to be respectively intersect and hinged under the reinforcing beam; wherein bottom of the upper hinged base is provided with a vertically downward sliding rod configured to pass through the first spring and the lower hinged base, and bottom end of the sliding rod is provided with a circular anti-falling plate, and the first spring is located between lower surface of the upper hinged base and upper surface of the lower hinged base.

In an embodiment, wherein the buoy includes a power buoy, an intermediate buoy and a driven buoy; the power buoy and the driven buoy are respectively located at two opposite corners on the outermost side of the folding panel frame and are installed under the folding panel frame through a hinge joint and a cross base; bottom of the power buoy and the driven buoy are fixed to the seabed through a catenary mooring; the cross base has a cylinder main body and four triangular ribs arranged in a cross are arranged around the main body of the cross base;

the power buoy includes a sensor installed on top thereof; a first circular tube slide rail is installed on top side of the power buoy facing the driven buoy and a pulley is provided between the first circular tube slide rail and the cross base in the center of the power buoy.

Optionally, the power buoy further includes a reel installed inside thereof, and an axis of the reel is perpendicular to an axis of the first circular tube slide rail; a rope is configured to passes through the circular pipe slide rail and connected to the reel through the pulley; a motor installed inside the power buoy is configured to having axis parallel to axis of the reel and the reel is configure d to be connected with the motor through a transmission belt.

In an embodiment, wherein the intermediate buoy is located between the power buoy and the driven buoy; a cross base and a hinge node is provided in top center of the intermediate buoy; the hinged node at top of the intermediate buoy is connected to one of the intersecting two unit frames close to the power buoy; top of the intermediate buoy is provided with a second circular pipe slide rail along a direction of the connection line between the power buoy and the driven buoy; a top side of the driven buoy facing the power buoy is equipped with a third circular tube slide rail, and the cross base and the hinged joints are installed in top center of the driven buoy; a fixed base is provided between the third circular tube slide rail and the cross base in the center of the driven buoy; and a drag rope is configured to passes through the third circular tube slide rail and fix on the fixed base.

In an embodiment, wherein a base of the first circular tube slide rail is configured to be fixed on the power buoy, and an end of the first circular tube slide rail pointing to the second circular tube slide rail is configured to extend out of the power buoy, and a tubular slot is installed inside the protruding end of the first circular slide rail; the second circular tube slide rail is configured to pass through the cross base and both ends thereof is configured to extend out of the intermediate buoy, and an end of the second circular tube slide rail close to the power buoy is equipped with a self-locking apparatus, and an end of the second circular tube slide rail close to the driven buoy is provided with a tubular slot;

a base of the third circular tube slide rail is fixed on the driven buoy, and an end of the third circular tube slide rail pointing to the second circular tube slide rail is configured to extend out of the driven buoy, and a self-locking apparatus is installed on the protruding end of the third circular tube slide rail.

In an embodiment, wherein the tubular slot is configured to have a trumpet-shaped opening, and outer diameter of the trumpet-shaped opening is larger than outer diameter of the self-locking device, and inner diameter of the trumpet-shaped opening is equal to outer diameter of the self-locking device, and a rectangular slot is provided inwardly along tube length direction just above the innermost side of the trumpet-shaped opening of the tubular slot 408; a jacking tube protruding toward the opening of the tubular slot is provided at a connecting joint of the tubular slot 408 and the self-locking device, and length of the jacking tube is less than length of the tubular slot 408; outer diameter of the jacking pipe is smaller than inner diameter of the self-locking device and larger than outer diameter of the rope, and inner diameter of the jacking pipe is equal to outer diameter of the rope; the jacking pipe is configured to have a trumpet-shaped opening and the outer diameter of the trumpet-shaped opening of the jacking pipe is equal to the outer diameter of the jacking pipe, and inner diameter of the trumpet-shaped opening of the jacking pipe is equal to inner diameter of the jacking pipe.

In an embodiment, wherein the self-locking apparatus is configured to have a round tube shape main body, and a tubular slide groove is fixed inside the self-locking apparatus; a fixing ring is provided at an opening of the self-locking apparatus, and the inner diameter of the fixing ring is larger than outer diameter of the jacking pipe and smaller than inner diameter of the self-locking apparatus; a gasket is provided at connecting joint of the self-locking apparatus, the third circular tube slide rail and the second circular tube slide rail, and a through hole through which the rope can pass is provided inside the gaskets; an end of the tubular slide groove close to the gasket is provided with a slide groove, and the slide to groove is a rectangular strip-shaped groove and is respectively arranged on the upper and lower sides of the tubular slide groove; two sides of the opening of the slide groove are respectively provided with a first locking tooth and a second locking tooth, and one side of the first locking tooth and the second locking tooth are axially parallel to the tubular slide groove and the other side is an oblique landslide; a locking block facing a rectangular through hole on the top of the self-locking device is provided at bottom of the slide groove, and a first slide tube and the second spring are installed between the tubular slide groove and the gaskets, and a third spring and a second slide tube is installed between the tubular slide groove and the fixing ring.

In an embodiment, wherein the main body of the first slide tube is configured to be in tubular shape and outer diameter of the first slide tube is equal to inner diameter of the tubular slide groove; inner diameter of the first slide tube is larger than outer diameter of the rope, and one end of the slide tube close to the tubular slide groove is provided with a third locking tooth, and the third locking teeth and the first locking tooth have the same shape and opposite direction; wherein the third locking teeth is configured to protrude from the first slide tube and distance between the outer walls of the two third locking teeth is equal to outer diameter of the tubular slide groove, and the two third locking teeth is configured to be sliding into the slide groove; an end of the first slide tube close to the gasket is provided with an annular sliding block and the outer diameter of the annular sliding block is equal to inner diameter of the self-locking apparatus, and a second spring is installed between the first slide tube and the gasket;

the second slide tube is configured to have a tubular main body, and outer diameter of the second slide tube is equal to inner diameter of the tubular slide groove, and inner diameter of the second slide tube is larger than outer diameter of the rope; one end of the second slide tube close to the tubular slide groove is provided with a fourth locking tooth and the fourth locking tooth is configured to protrude from the second slide tube; wherein outer diameter of the ring surrounded by the fourth locking tooth is larger than inner diameter of the tubular slide groove and smaller than outer diameter of the tubular slide groove;

a slot for the four locking tooth to slide is provided inside the tubular slide groove, and the fourth locking tooth on the upper and lower sides is configured to be sliding along the slide groove, and an end of the second slide tube away from the gasket is provided with an annular sliding block with outer diameter equal to inner diameter of the self-locking apparatus; a tapered jacking block configured to be passed by the rope is provided at bottom of annular sliding block of the second slide tube, and a third spring is installed between the second slide pipe and the tubular slide groove.

A control method for controlling the anti-wave floating photovoltaic device, comprising:

Step a, when the wind and wave resistant floating photovoltaic device is in severe sea conditions, the sensor is configured to receive the environmental information and transmits it to the motor, and the motor drives the reel to roll up the rope, and the rope makes the power buoy and the driven buoy close to each other and make the floating photovoltaic device shrink laterally, and the folding frame 1 transmits the pulling force of the rope and shrinks the floating photovoltaic device longitudinally at the same time; when the floating photovoltaic device shrinks to limit length of the self-locking supporting rod, the adjacent contacting end of the self-locking supporting rod are folded and locked together;

step b, when the wind and wave resistant floating photovoltaic device changes from the severe sea conditions to normal sea conditions, the sensor is configured to control the motor to tighten the rope, and the contacting ends of the adjacent self-locking support rod are squeezed and unlocked, and the motor slowly reverses to turn and loosen the rope, and the elastic supporting leg makes the folding panel frame 1 unfold to the size limited by the rope.

Compared with related technologies, the beneficial effects of the present invention are as follows:

(1) The folding panel frame is set by Miura folding method, when the folding panel frame is opened, the bottom buoy is flexibly connected by the rod, and the flexibility generated by the rotation of the folding panel frame through the hinge mechanism makes the floating photovoltaic device can better adapt to wave swing, with good wave dissipation effect.

(2) When the folding board frame is opened, the side where the photovoltaic panels are laid has a certain inclination angle, and at the same time, there is a certain distance between the two rows of photovoltaic panels, which is very structurally in line with the laying requirements of the photovoltaic panels, so that the photovoltaic panels face the sun without to Mutual shading improves the power generation efficiency of photovoltaic panels.

(3) After the folding panel frame is folded, the included angle between adjacent photovoltaic panels is reduced, and the front row of photovoltaic panels covers the rear row of photovoltaic panels, which greatly reduces the wind receiving area. At the same time, the Miura folded structure can transfer local stress to the overall structure, improving the wind and wave resistance of the device;

(4) The unit frame can quickly assemble the adjacent unit frames through the hinge mechanism, the adjacent unit frames can share some of the buoys, and multiple groups of unit frames can share one power buoy, which improves the convenience of the device.

(5) The self-locking support rod realizes the fast locking and separation of adjacent support rod through the self-locking structure, and at the same time, the locking of the self-locking supporting rod increases the structural strength of the floating photovoltaic device when it is folded, and improves the flexibility and reliability of the device.

Figure 1:
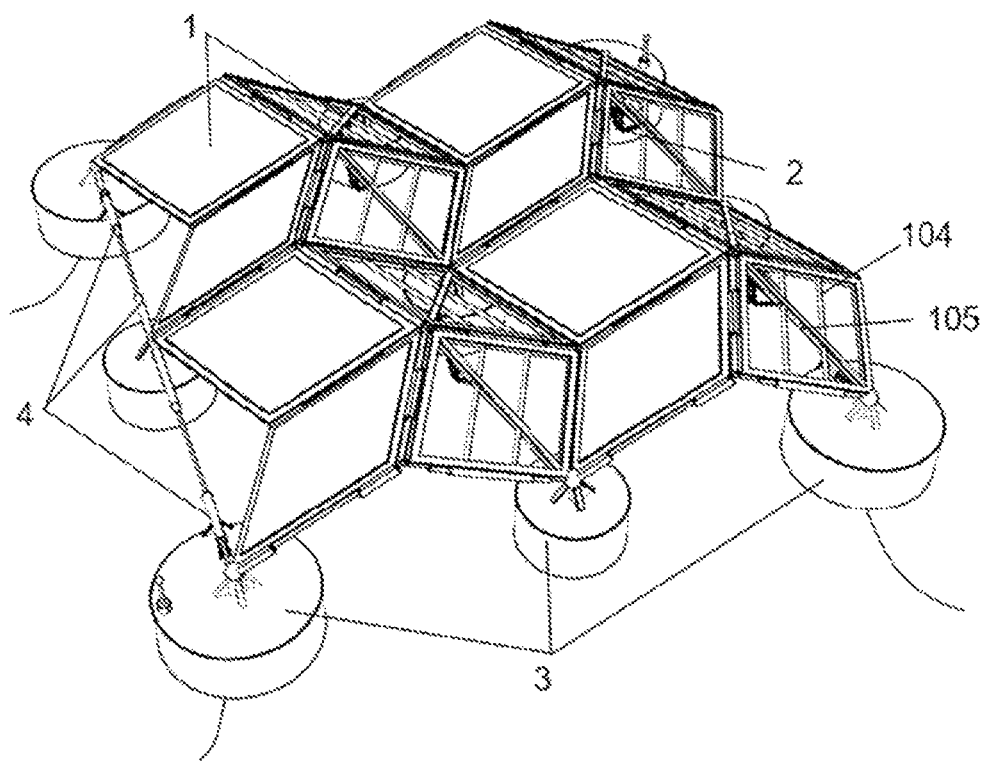
FIG. 1 is three-dimensional schematic diagram of the wind and wave resistant floating photovoltaic device in unfolded state according the present invention.

Marking is as follows among the figure:
1—folding panel frame, 2—elastic supporting leg, 3—buoy, 4—self-locking support rod, 101—photovoltaic panel, 102—unit frame, 103—hinge mechanism, 104—anti-slip ladder rod, 105—reinforcing beam, 106—anti-wind plate, 201—V-shaped supporting rod, 202—upper hinged base, 203—first spring, 204—U-shaped supporting rod, 205—lower hinged base, 206—sliding rod, 301—power buoy, 302—sensor, 303—intermediate buoy, 304—driven buoy, 305—cross base, 306—hinged node, 307—reel, 308—motor, 309—transmission belt, 310—catenary mooring, 401—fixed base, 402—third circular tube slide rail, 403—second circular tube slide rail, 404—rope, 405—first circular slide rail, 406—pulley, 407—tapered jacking block, 408—tubular slot, 409—rectangular slot, 410—locking block, 411—jacking tube, 412—tubular slide groove, 413—slde groove, 414—first locking tooth, 415—third locking tooth, 416—first slide tube, 417—second spring, 418—fourth locking tooth, 419—third spring, 420—second slide tube, 421—gasket, 422—fixing ring, 423—second locking tooth, 424—self-locking apparatus.

DETAILED EMBODIMENTS

In order to make the object, technical solution and advantages of the present invention clearer, the present invention will be described in further detail below in conjunction with the accompanying drawings and embodiments. In the description of the present invention, it should be noted that "center", "landscape", "vertical", "length", "width", "thickness", "top", "bottom", "front", "back", "left", "right", "clockwise", "counterclockwise", etc. indicate that the orientation and positional relationship are based on the orientation or positional relationship shown in the drawings, which are only for the convenience of describing the present invention and simplifying the description, rather than indicating or implying that the referred device or element must have a specific orientation, construction and operation in a particular orientation are not to be construed as limiting the specific scope of the invention.

Figure 2:
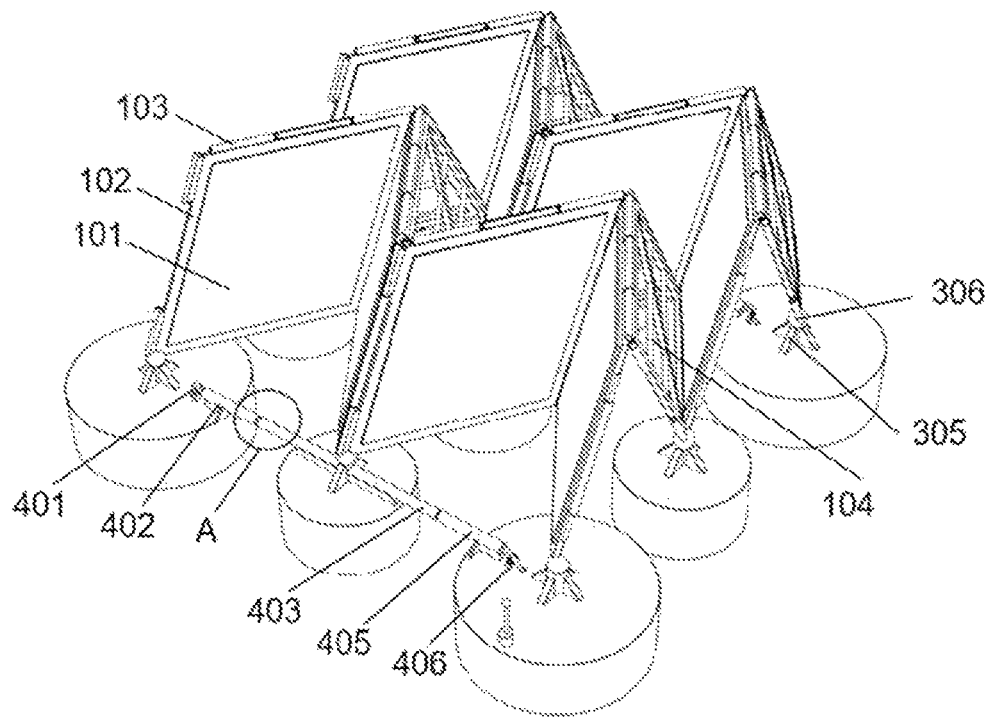
FIG. 2 is three-dimensional schematic diagram of the wind and wave resistant floating photovoltaic device in folded state according the present invention.
Figure 3:
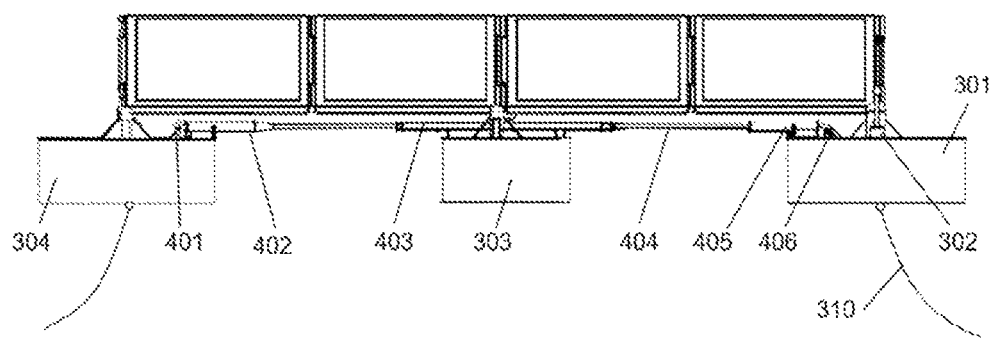
FIG. 3 is front view of the wind and wave resistant floating photovoltaic device according the present invention.

As shown in FIGS. 1-3, a wind and wave resistant floating photovoltaic device includes a folding panel frame 1, elastic supporting legs 2, buoys 3 and self-locking support rod 4. The folding panel frame 1 includes a plurality of unit frames 102 and is unfolded and folded by the Miura folding way. The adjacent unit frames 102 are connected by a hinge mechanism 103. The photovoltaic panel 101 is provided on the side of the foldable panel frame 1 facing the sun. The elastic supporting legs 2 are installed under the reinforcing beams 105 on both sides of the peak line on the side of the foldable frame 1 facing away from the sun. The buoy 3 is installed below the bottom of the front peak line of the folding panel frame 1 through the hinged joint 306 and the cross base 305. The two buoys 3 adjacent to each other in the direction of horizontal photovoltaic panel arrangement are connected with the rope 404 through the self-locking support rod 4.

As shown in FIG. 2, the folding panel frame 1 includes a plurality of unit frames 102. The unit frames 102 are parallelograms. The four sides of the unit frame 102 are installed with hinge mechanisms 103. The photovoltaic panels 101 are installed inside the unit frame 102 on the front of the folding panel frame 1. The reinforcing beam 105 is installed on the connection line of the obtuse angle inside the unit frame 102 on the back of the folding panel frame 1. The bisection point inside the reinforcing beam 105 is passed through the anti-slip ladder rod 104, and the anti-slip ladder rodd 104 is parallel to the upper and lower sides of the unit frame 102. The two ends of the anti-slip ladder rod 104 are fixed on both sides of the unit frame 102. A anti-wind plate 106 is installed on the unit frame 102 at the back of the last row of the folding panel frame 1.

Figure 4:
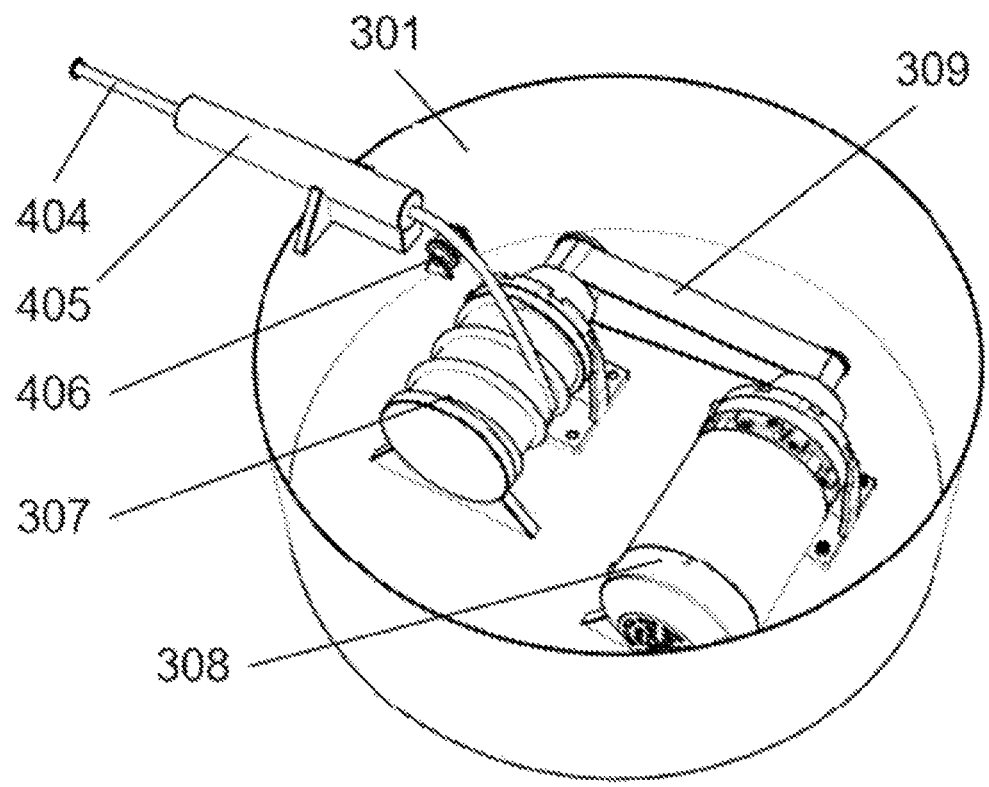
FIG. 4 is three-dimensional schematic diagram of the power buoy of the present invention.

As shown in FIGS. 3-4, the buoy 3 includes a power buoy 301, an intermediate buoy 303 and a driven buoy 304. The power buoy 301 and the driven buoy 304 are respectively located at two opposite corners on the outermost sides of the folding panel frame 1 and are installed below the folding panel 1 through the hinge joint 306 and the cross base 305. The bottoms of the power buoy 301 and the driven buoy 304 are fixed to the seabed through a catenary mooring 310. The main body of the cross base 305 is a cylinder. The main body of the cross base 305 is provided with four triangular ribs in a cross arrangement. A sensor 302 is installed on the top of the power buoy 301. A first circular tube slide rail 405 is installed on the side of the top of the power buoy 301 facing the driven buoy 304. A pulley 406 is provided between the first circular tube slide rail 405 and the cross base 305 at the center of the power buoy 301. A reel 307 is installed inside the power buoy 301. The axial direction of the reel 307 is perpendicular to the axial direction of the first circular tube slide rail 405. The rope 404 passes through the first circular tube slide rail 405 and is connected to the reel 307 through the pulley 406. The motor 308 is installed inside the power buoy 301 and its axis is parallel to the axis of the reel 307. The reel 307 is connected with the motor 308 through a transmission belt 309. The intermediate buoy 303 is located between the driving buoy 301 and the driven buoy 304. A cross base 305 and a hinge node 306 are provided at the center of the top of the intermediate buoy 303. The top of the intermediate buoy 303 is provided with a second circular tube slide rail 403 along the connecting line direction of the power buoy 301 and the driven buoy 304. The third circular tube slide rail 402 is installed on the side of the driven buoy 304 top facing the power buoy 301. The cross base 305 and the hinge node 306 are installed in the center of the top of the driven buoy 304. A fixed base 401 is provided between the third circular slide rail 402 and the cross base 305 at the center of the driven buoy 304. The rope 404 passes through the third circular tube slide rail 402 and is fixed on the fixed base 401.

Figure 5:
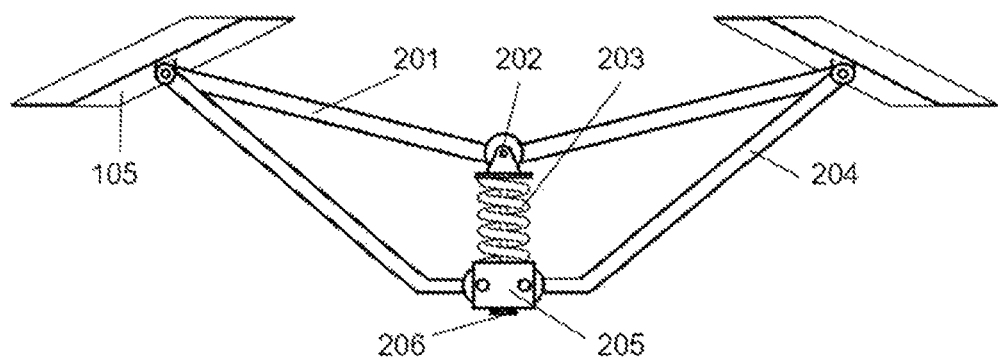
FIG. 5 is front view of the elastic supporting leg of the present invention.

As shown in FIG. 5, the elastic supporting leg 2 includes a V-shaped supporting rod 201 and a U-shaped supporting rod 204. The bottom intersection of the V-shaped supporting rod 201 is hinged to the upper hinged base 202. The bottom of the U-shaped supporting rod 204 is hinged to the lower hinged base 205. The V-shaped supporting rod 201 and the U-shaped supporting rod 204 can change the size of its opening. The left and right ends of the V-shaped supporting rod 201 and the U-shaped supporting rod 204 respectively intersect and are hinged under the reinforcing beam 105. The bottom of the upper hinged base 202 is provided with a vertically downward sliding rod 206. The sliding rod 206 passes through the first spring 203 and the lower hinge base 205. The bottom end of the sliding rod 206 is provided with a circular anti-falling baffle. The first spring 203 is installed between the lower surface of the upper hinged base 202 and the upper surface of the lower hinged base 205.

Figure 6:
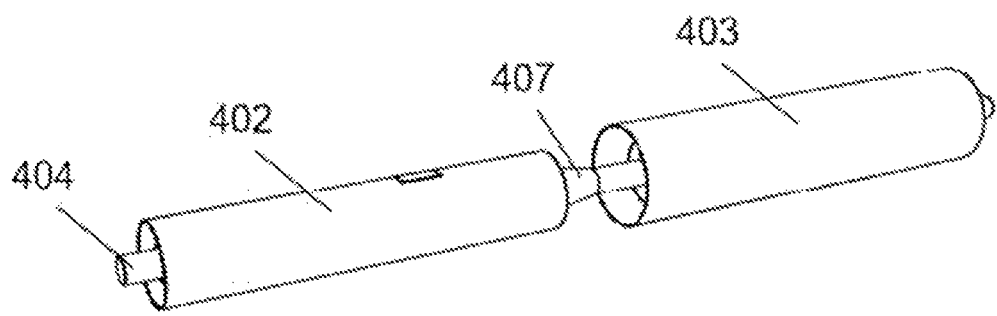
FIG. 6 is partial enlarged view of part A in FIG. 2.
Figure 7:
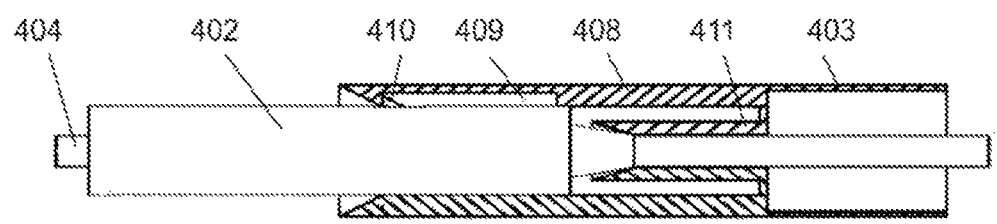
FIG. 7 is partial sectional view of the self-locking support rod of the present invention in locked state.
Figure 8:
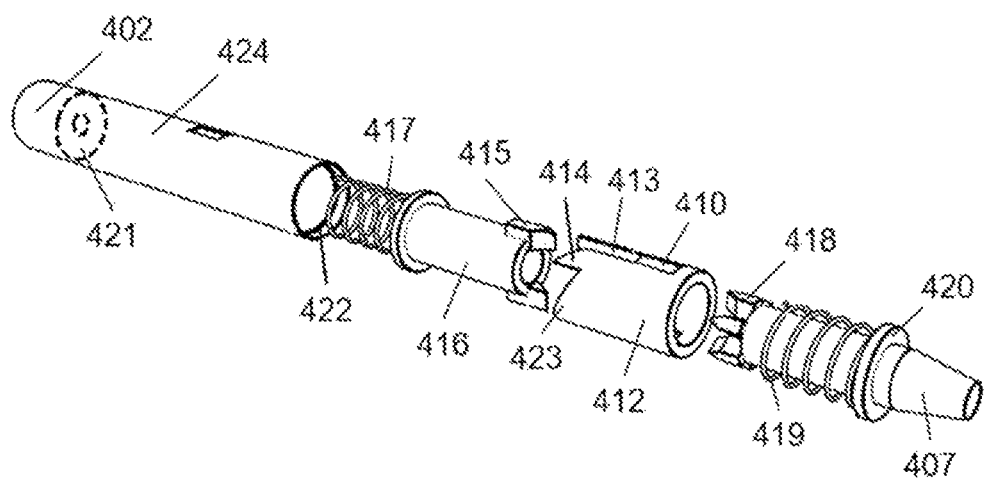
FIG. 8 is exploded view of parts of self-locking apparatus of the present invention.

As shown in FIGS. 6-8, the base of the first circular tube slide rail 405 is fixed to the power buoy 301. One end of the first circular tube slide rail 405 pointing to the second circular tube slide rail 403 extends out of the power buoy 301. A tubular slot 408 is installed inside the protruding end of the first circular tube slide rail 405. The second circular tube slide rail 403 passes through the cross base 305 and both ends protrude from the intermediate buoy 303. A self-locking apparatus 424 is installed on the end of the second circular tube slide rail 403 near the power buoy 301. The end of the second circular tube slide rail 403 close to the driven buoy 304 is provided with the tubular slot 408. The base of the third circular tube slide rail 402 is fixed on the driven buoy 304. The end of the third tube slide rail 402 pointing to the second circular tube slide rail 403 protrudes out of the driven buoy 304. A self-locking apparatus 424 is installed at the protruding end of the third circular tube slide rail 402. The opening of the tubular slot 408 is trumpet-shaped. The outer diameter of the trumpet-shaped opening of the tubular slot 408 is larger than the outer diameter of the self-locking device 424. The inner diameter of the trumpet-shaped opening of the tubular slot 408 is equal to the outer diameter of the self-locking device 424. A rectangular slot 409 is provided inwardly along the tube length direction just above the innermost side of the trumpet-shaped opening of the tubular slot 408. A jacking tube 411 protruding toward the opening of the tubular slot 408 is provided at the joint between the tubular slot 408 and the self-locking device. The length of the jacking tube 411 is less than the length of the tubular slot 408. The outer diameter of the jacking pipe 411 is smaller than the inner diameter of the self-locking device 424 and larger than the outer diameter of the rope 404. The inner diameter of the jacking pipe 411 is equal to the outer diameter of the rope 404. The opening of the jacking pipe 411 is trumpet-shaped. The diameter of the outer circle of the trumpet-shaped opening of the jacking pipe 411 is equal to the outer diameter of the jacking pipe 411. The inner diameter of the trumpet-shaped opening of the jacking pipe 411 is equal to the inner diameter of the jacking pipe 411. The main body of the self-locking apparatus 424 is in the shape of a round tube. A fixing ring 422 is provided at the opening of the self-locking apparatus 424. A tubular slide groove 412 is fixed inside the self-locking apparatus 424. The inner diameter of the fixing ring 422 is larger than the outer diameter of the jacking pipe 411 and smaller than the inner diameter of the self-locking apparatus 424. Gaskets 421 are provided at the junctions between the self-locking apparatus 424, the third circular tube slide rail 402 and the second circular tube slide rail 403. A through hole through which the rope 404 can pass is provided inside the gaskets 421. An end of the tubular slide groove 412 close to the gaskets 421 is provided with a slide groove 413. The slide groove 413 is a rectangular strip-shaped groove. The slide groove 413 is respectively arranged on the upper and lower sides of the tubular slide groove 412. Two sides of the opening of the slide groove 413 are respectively provided with a first locking tooth 414 and a second locking tooth 423. One side of the first locking tooth 414 and the second locking tooth 423 are axially parallel to the tubular slide groove 412 and the other side is an oblique landslide. A locking block 410 is provided at the bottom of the slide groove 413. The locking block 410 is facing the rectangular through hole on the top of the self-locking device 424. A first slide tube 416 is installed between the tubular slide groove 412 and the gaskets 421. A second slide tube 420 is installed between the tubular slide groove 412 and the fixing ring 422. The main body of the first slide tube 416 is tubular. The outer diameter of the first slide tube 416 is equal to the inner diameter of the tubular slide groove 412. The inner diameter of the first slide tube 416 is larger than the outer diameter of the rope 404. One end of the slide tube 416 close to the tubular slide groove 412 is provided with a third locking tooth 415. The third locking teeth 415 and the first locking tooth 414 have the same shape and opposite direction. The third locking teeth 415 protrude from the first slide tube 416.

The distance between the outer walls of the two third locking teeth 415 is equal to the outer diameter of the tubular slide groove 412. The two locking teeth 415 can slide into the slide groove 413. The end of the first slide tube 416 close to the gasket 421 is provided with an annular sliding block whose outer diameter is equal to the inner diameter of the self-locking apparatus 424. A second spring 417 is installed between the first slide tube 416 and the gaskets 421. The main body of the second slide tube 420 is tubular. The outer diameter of the second slide tube 420 is equal to the inner diameter of the tubular slide groove 412. The inner diameter of the second slide tube 420 is larger than the outer diameter of the rope 404. One end of the second slide tube 420 close to the tubular slide groove 412 is provided with a fourth locking tooth 418. The fourth locking tooth 418 protrudes from second slide tube 420. The outer diameter of the ring surrounded by the fourth locking tooth 418 is larger than the inner diameter of the tubular slide groove 412 and smaller than the outer diameter of the tubular slide groove 412. The inside of the tubular slide groove 412 is provided with a slot for the four locking tooth 418 to slide. The fourth locking tooth 418 on the upper and lower sides can slide along the slide groove 413. The end of the second slide tube 420 away from the gasket 421 is provided with an annular sliding block whose outer diameter is equal to the inner diameter of the self-locking apparatus 424. The bottom of the second slide tube 420 is provided with a tapered jacking block 407 that can pass through the rope 404. A third spring 419 is installed between the second slide pipe 420 and the tubular slide groove 412.

Figure 9:
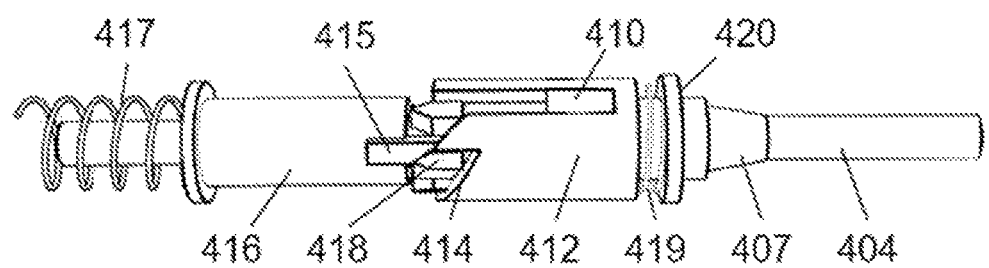
FIG. 9 is first motion schematic diagram of the self-locking support rod of the present invention.
Figure 10:
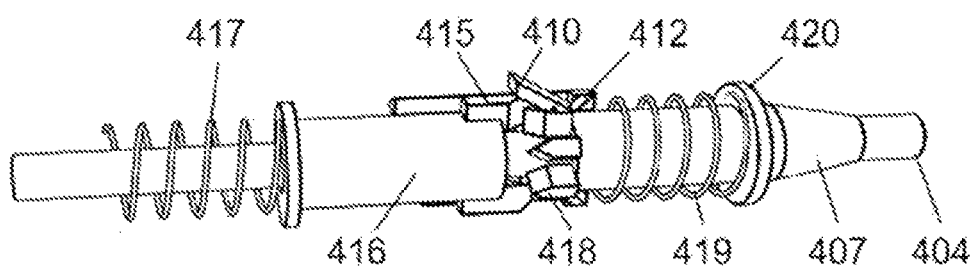
FIG. 10 is second motion schematic diagram of the self-locking support rod of the present invention.

As shown in FIGS. 9-10, when adjacent self-locking support rode 4 are squeezed against each other, the second slide tube 420 moves toward the left along the slide groove 413. The fourth locking tooth 418 moves to the leftmost end of the tubular slide groove 412, and the third locking tooth 415 is lifted up. The second spring 417 is compressed, and the first slide tube 416 is pushed by the second spring 417 to make the third locking tooth 415 slide along the slope of the first locking tooth 414 to the intersection of the fourth locking tooth 418 and the first locking tooth 414. When the buoy 3 stops moving, the second slide tube 420 moves toward the right under the action of the spring 419, and the third locking tooth 415 moves to the rightmost end of the slide groove 413 along the fourth locking tooth 418 under the action of the second spring 417. The third locking tooth 415 lifts the locking block 410, and the right end of the locking block 410 bears against the top surface of the fourth locking tooth 418 in the slide groove 413.

Figure 11:
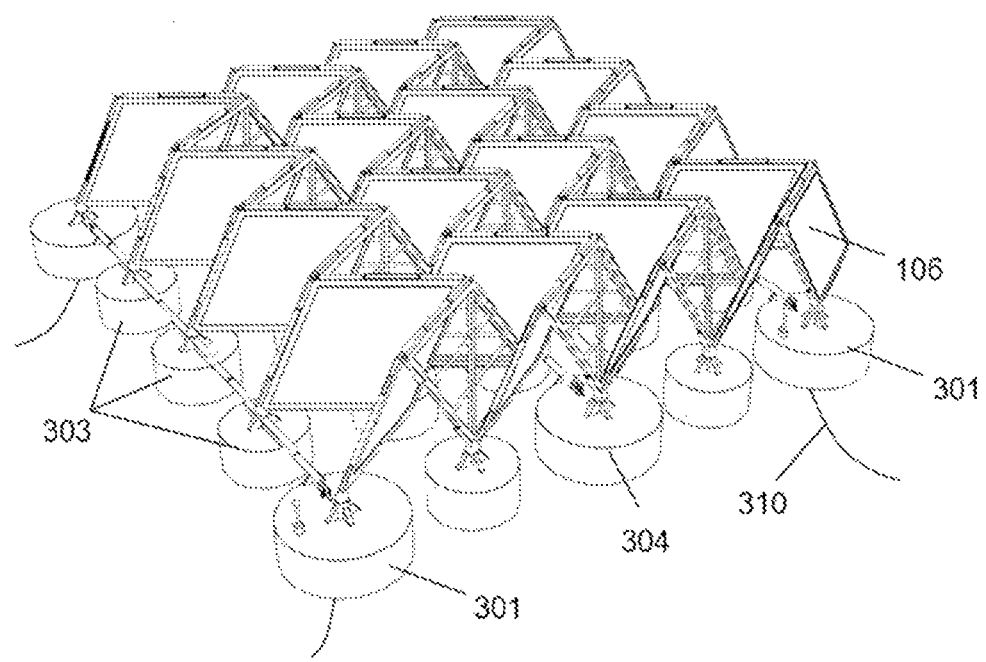
FIG. 11 is three-dimensional schematic diagram of the wind and wave resistant floating photovoltaic device in combination state.

As shown in FIG. 11, when multiple sets of wind and wave resistant floating photovoltaic device are combined, the intermediate buoy 303 replaces the power buoy 301 and the driven buoy 304 at the combination of two floating photovoltaic devices in the horizontal direction. Among the two vertically adjacent rows of floating photovoltaic devices, the floating photovoltaic devices in the back row share a set of buoys 3 with the floating photovoltaic devices in the front row.

In this embodiment, the folding panel frame 1 is arranged by means of Miura folding. When the folding panel frame 1 is unfolded, the bottom buoy 3 is flexibly connected by the rope 404, and the flexibility generated by the rotation of the folding panel frame 1 through the hinge mechanism 103 makes the floating photovoltaic device better adapt to the wave swing and has a good wave dissipation effect. When the folding panel frame 1 is unfolded, the side where the photovoltaic panels 101 are laid has a certain inclination angle, and at the same time, there is a certain distance between the two rows of photovoltaic panels 101, which is very suitable for the laying requirements of the photovoltaic panels 101 in terms of structure, so that the photovoltaic panels 101 face the sun and do not block each other, which improves the power generation efficiency of the photovoltaic panels. After the folding frame 1 is folded, the included angle between adjacent photovoltaic panels 101 is reduced, and the front row of photovoltaic panels 101 covers the rear row of photovoltaic panels 101, which greatly reduces the wind receiving area. At the same time, the Miura folding structure of the folding panel frame 1 can transfer local stress to the overall structure, improving the wind and wave resistance of the device. The unit frame 102 can quickly assemble adjacent unit frames 102 through the hinge mechanism 103. Adjacent unit frames 102 can share part of the buoy 3, and multiple groups of unit frames 102 can share one power buoy 301, which improves the convenience of the device. The self-locking supporting rod 4 realizes the rapid locking and separation of adjacent supporting rod through the self-locking structure. At the same time, the self-locking supporting rod 4 increases the structural strength of the floating photovoltaic device when it is folded, and improves the flexibility and reliability of the device.

A control method for a wind and wave resistant floating photovoltaic device is shown in FIG. 1-11, including the following steps:

Step a, when the wind and wave resistant floating photovoltaic device is in severe sea conditions, the sensor 302 receives the environmental information and transmits it to the motor 308, and the motor 308 drives the reel 307 to roll up the rope 404, and the rope 404 makes the power buoy 301 and the driven buoy 304 close to each other and make the floating photovoltaic device shrink laterally. The folding frame 1 transmits the pulling force of the rope 404 and shrinks the floating photovoltaic device longitudinally at the same time. When the floating photovoltaic device shrinks to the limit length of the self-locking supporting rod 4, the adjacent contact ends of the self-locking supporting rod 4 are squeezed and locked together.

Step b, when the wind and wave resistant floating photovoltaic device changes from bad sea conditions to normal sea conditions, the sensor 302 controls the motor 308 to tighten the rope 404, and the contact ends of adjacent self-locking support rod 4 are squeezed and unlocked, and the motor 308 slowly reverses to turn and loosen the rope 404, and the elastic supporting leg 2 makes the folding panel frame 1 unfold to the size limited by the rope 404.

The basic principles, main features and advantages of the present invention have been shown and described above. Those skilled in the art should understand that what is described in the above description is only to illustrate the principle of the present invention, and without departing from the spirit and scope of the present invention, the present invention will have various changes and improvements, and these changes and improvements all fall within the scope of the claimed invention.

The protection scope of the present invention is defined by the appended claims and their equivalents.

The invention claimed is:
1. An anti-wave floating photovoltaic device, comprising:
a folding panel frame including multiple unit frames and configured to be folded or unfolded by Miura folding;
an elastic support leg configured to be installed under reinforcing beams on both sides of a back peak line of the folded panel frame on the side facing away from the sun;

a buoy configured to be installed below bottom of a front peak line of the folding panel frame through a hinged node and a cross base, and a self-locking support rod including a first circular tube slide rail, a second circular tube slide rail and a third circular tube slide rail;

wherein the adjacent unit frames are connected by a hinge mechanism and at least one photovoltaic panel is provided on the front side of the folded panel frame facing the sun and two horizontally adjacent buoys are connected to a rope through the self-locking support rod.

2. The anti-wave floating photovoltaic device of claim 1, wherein the folded panel frame includes a plurality of unit frames in the shape of parallelogram and provided with hinge mechanisms on four sides;

wherein the at least one photovoltaic panel is installed inside each unit frame on front of the folding panel frame, and a reinforcing beam are installed at connection line of an obtuse angle inside the unit frame on back of the folding panel frame;

wherein internal bisection point of the reinforcing beam is configured to be passed by an anti-slip ladder rod parallel to an upper and lower sides of the unit frame, and two ends of the anti-slip ladder rod are fixed on both sides of the unit frame, and an anti-wind plate is installed on the unit frame at the back of last row of the folding board frame.

3. The anti-wave floating photovoltaic device of claim 1, wherein the elastic support leg include a V-shaped support rod and a U-shaped support rod;

bottom intersection of the V-shaped support rod is hinged to an upper hinged base, and bottom of the U-shaped support rod is hinged to a lower hinged base;

the V-shaped support rod and the U-shaped support rod is configured to have a changeable opening and left and right ends of the V-shaped support rod and the U-shaped support rod are configured to be respectively intersect and hinged under the reinforcing beam;

wherein bottom of the upper hinged base is provided with a vertically downward sliding rod configured to pass through a first spring and the lower hinged base, and bottom end of the sliding rod is provided with a circular anti-falling plate, and the first spring is located between lower surface of the upper hinged base and upper surface of the lower hinged base.

4. The anti-wave floating photovoltaic device of claim 3, wherein the buoy includes a power buoy, an intermediate buoy and a driven buoy; the power buoy and the driven buoy are respectively located at two opposite corners on the outermost side of the folding panel frame and are installed under the folding panel frame through a hinge joint and a cross base; bottom of the power buoy and the driven buoy are fixed to the seabed through a catenary mooring;

the cross base has a cylinder main body and four triangular ribs arranged in a cross are arranged around the main body of the cross base;

the power buoy includes a sensor installed on top thereof; a first circular tube slide rail is installed on top side of the power buoy facing the driven buoy and a pulley is provided between the first circular tube slide rail and the cross base in the center of the power buoy;

wherein the power buoy further includes a reel installed inside thereof, and an axis of the reel is perpendicular to an axis of the first circular tube slide rail; a rope is configured to passes through the circular pipe slide rail and connected to the reel through the pulley; a motor installed inside the power buoy is configured to having axis parallel to axis of the reel and the reel is configured to be connected with the motor through a transmission belt.

5. The anti-wave floating photovoltaic device of claim 4, wherein the intermediate buoy is located between the power buoy and the driven buoy; a cross base and a hinge node is provided in top center of the intermediate buoy; the hinged node at top of the intermediate buoy is connected to one of the intersecting two unit frames close to the power buoy;

top of the intermediate buoy is provided with a second circular pipe slide rail along a direction of the connection line between the power buoy and the driven buoy;

a top side of the driven buoy facing the power buoy is equipped with a third circular tube slide rail, and the cross base and the hinged joints are installed in top center of the driven buoy;

a fixed base is provided between the third circular tube slide rail and the cross base in the center of the driven buoy; and a drag rope is configured to passes through the third circular tube slide rail and fix on the fixed base.

6. The anti-wave floating photovoltaic device of claim 5, wherein a base of the first circular tube slide rail is configured to be fixed on the power buoy, and an end of the first circular tube slide rail pointing to the second circular tube slide rail is configured to extend out of the power buoy, and a tubular slot is installed inside the protruding end of the first circular slide rail;

the second circular tube slide rail is configured to pass through the cross base and both ends thereof is configured to extend out of the intermediate buoy, and an end of the second circular tube slide rail close to the power buoy is equipped with a self-locking apparatus, and an end of the second circular tube slide rail close to the driven buoy is provided with a tubular slot;

a base of the third circular tube slide rail is fixed on the driven buoy, and an end of the third circular tube slide rail pointing to the second circular tube slide rail is configured to extend out of the driven buoy, and a self-locking apparatus is installed on the protruding end of the third circular tube slide rail.

7. The anti-wave floating photovoltaic device of claim 6, wherein the tubular slot is configured to have a trumpet-shaped opening, and outer diameter of the trumpet-shaped opening is larger than outer diameter of the self-locking device, and inner diameter of the trumpet-shaped opening is equal to outer diameter of the self-locking device, and a rectangular slot is provided inwardly along tube length direction just above the innermost side of the trumpet-shaped opening of the tubular slot; a jacking tube protruding toward the opening of the tubular slot is provided at a connecting joint of the tubular slot and the self-locking device, and length of the jacking tube is less than length of the tubular slot; outer diameter of the jacking pipe is smaller than inner diameter of the self-locking device and larger than outer diameter of the rope, and inner diameter of the jacking pipe is equal to outer diameter of the rope; the jacking pipe is configured to have a trumpet-shaped opening and the outer diameter of the trumpet-shaped opening of the jacking pipe is equal to the outer diameter of the jacking pipe, and inner diameter of the trumpet-shaped opening of the jacking pipe is equal to inner diameter of the jacking pipe.

8. The anti-wave floating photovoltaic device of claim 7, wherein the self-locking apparatus is configured to have a round tube shape main body, and a tubular slide groove is fixed inside the self-locking apparatus;
a fixing ring is provided at an opening of the self-locking apparatus, and the inner diameter of the fixing ring is larger than outer diameter of the jacking pipe and smaller than inner diameter of the self-locking apparatus;
a gasket is provided at connecting joint of the self-locking apparatus, the third circular tube slide rail and the second circular tube slide rail, and a through hole through which the rope can pass is provided inside the gaskets;
an end of the tubular slide groove close to the gasket is provided with a slide groove, and the slide groove is a rectangular strip-shaped groove and is respectively arranged on the upper and lower sides of the tubular slide groove;
two sides of the opening of the slide groove are respectively provided with a first locking tooth and a second locking tooth, and one side of the first locking tooth and the second locking tooth are axially parallel to the tubular slide groove and the other side is an oblique landslide;
a locking block facing a rectangular through hole on the top of the self-locking device is provided at bottom of the slide groove, and a first slide tube is installed between the tubular slide groove and the gaskets and a second slide tube is installed between the tubular slide groove and the fixing ring.

9. The anti-wave floating photovoltaic device of claim 8, wherein the main body of the first slide tube is configured to be in tubular shape and outer diameter of the first slide tube is equal to inner diameter of the tubular slide groove;
inner diameter of the first slide tube is larger than outer diameter of the rope, and one end of the slide tube close to the tubular slide groove is provided with a third locking tooth, and the third locking teeth and the first locking tooth have the same shape and opposite direction;
wherein the third locking teeth is configured to protrude from the first slide tube and distance between the outer walls of the two third locking teeth is equal to outer diameter of the tubular slide groove, and the two third locking teeth is configured to be sliding into the slide groove;
an end of the first slide tube close to the gasket is provided with an annular sliding block and the outer diameter of the annular sliding block is equal to inner diameter of the self-locking apparatus, and a second spring is installed between the first slide tube and the gasket;

the second slide tube is configured to have a tubular main body, and outer diameter of the second slide tube is equal to inner diameter of the tubular slide groove, and inner diameter of the second slide tube is larger than outer diameter of the rope;
one end of the second slide tube close to the tubular slide groove is provided with a fourth locking tooth and the fourth locking tooth is configured to protrude from the second slide tube;
wherein outer diameter of the ring surrounded by the fourth locking tooth is larger than inner diameter of the tubular slide groove and smaller than outer diameter of the tubular slide groove;
a slot for the four locking tooth to slide is provided inside the tubular slide groove, and the fourth locking tooth on the upper and lower sides is configured to be sliding along the slide groove, and an end of the second slide tube away from the gasket is provided with an annular sliding block with outer diameter equal to inner diameter of the self-locking apparatus;
a tapered jacking block configured to be passed by the rope is provided at bottom of annular sliding block of the second slide tube, and a third spring is installed between the second slide pipe and the tubular slide groove.

10. A control method for controlling the anti-wave floating photovoltaic device of claim 4, comprising:
tep a, when the wind and wave resistant floating photovoltaic device is in severe sea conditions, the sensor is configured to receive the environmental information and transmits it to the motor, and the motor drives the reel to roll up the rope, and the rope makes the power buoy and the driven buoy close to each other and make the floating photovoltaic device shrink laterally, and the folding panel frame transmits the pulling force of the rope and shrinks the floating photovoltaic device longitudinally at the same time; when the floating photovoltaic device shrinks to limit length of the self-locking supporting rod, the adjacent contacting end of the self-locking supporting rod are squeezed and locked together;
step b, when the wind and wave resistant floating photovoltaic device changes from the severe sea conditions to normal sea conditions, the sensor is configured to control the motor to tighten the rope, and the contacting ends of the adjacent self-locking support rod are squeezed and unlocked, and the motor slowly reverses to turn and loosen the rope, and the elastic supporting leg makes the folding panel frame unfold to the size limited by the rope.

* * * * *